United States Patent Office 2,958,909
Patented Nov. 8, 1960

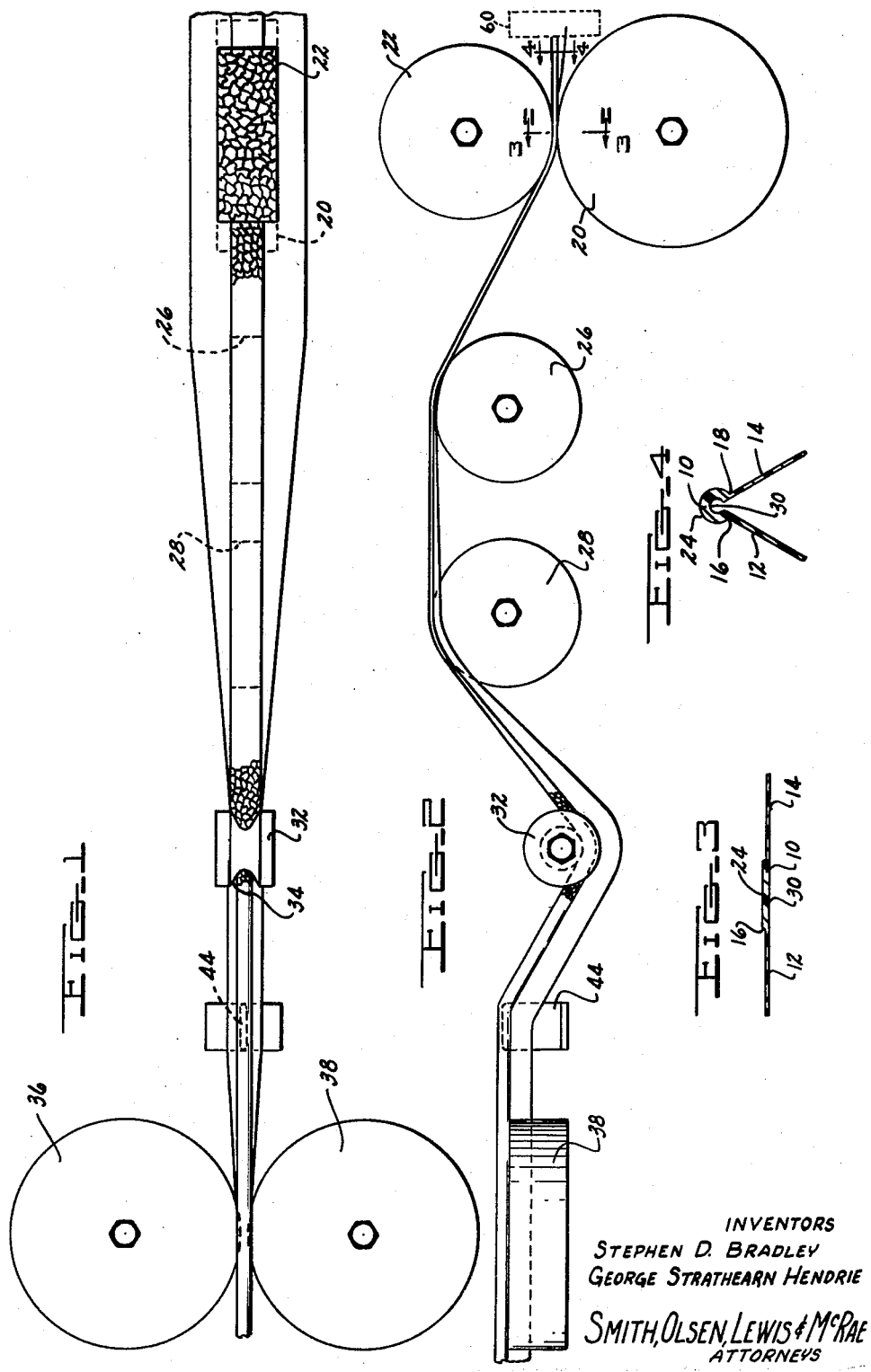

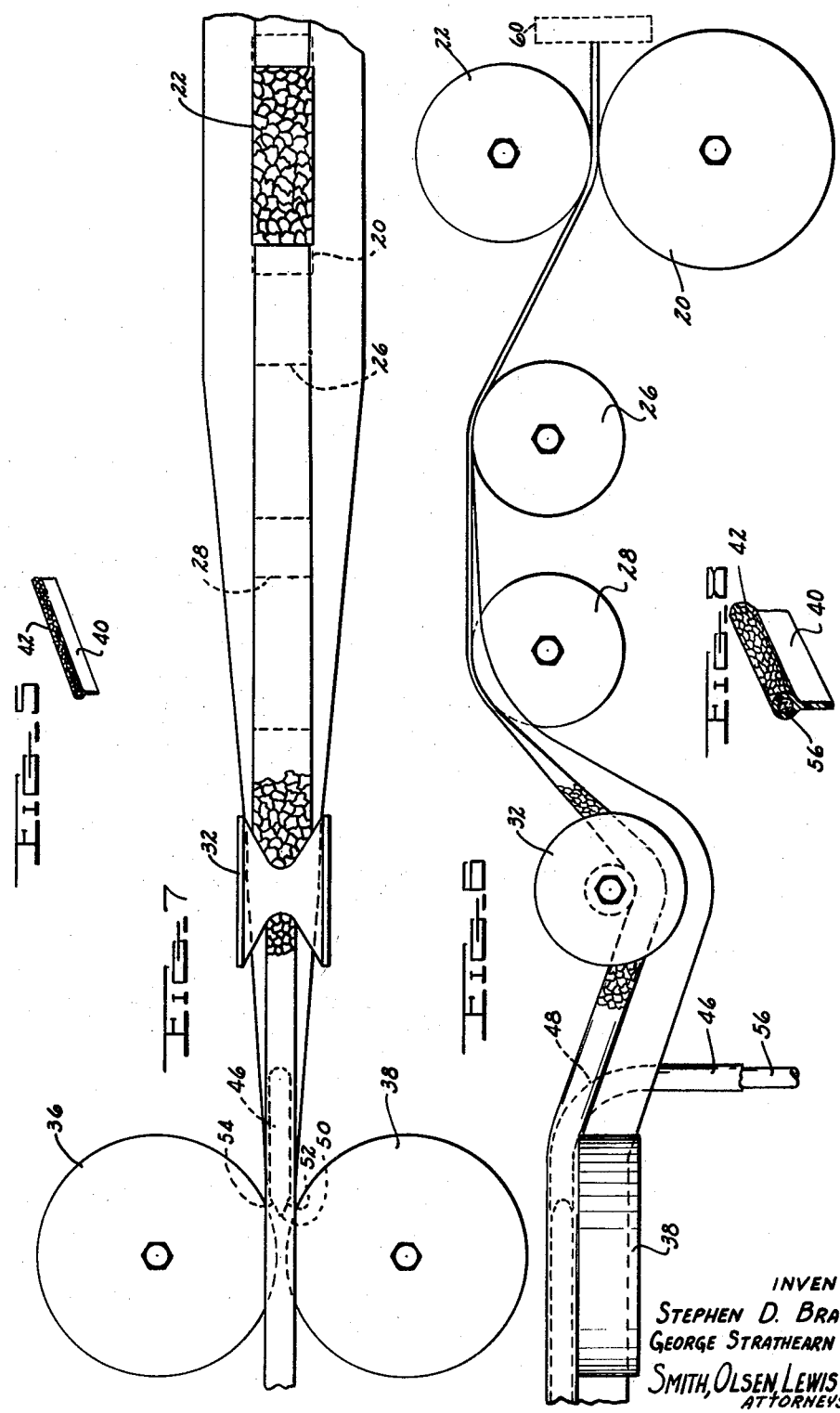

2,958,909

FINISHING WELT WITH GRAINED BEAD SURFACE AND METHOD OF MAKING SAME

Stephen D. Bradley, Detroit, and George Strathearn Hendrie, Grosse Pointe, Mich., assignors to Detroit Macoid Corporation, Detroit, Mich., a corporation of Michigan Filed June 20, 1957, Ser. No. 667,004

6 Claims. (Cl. 18—59)

This invention relates in general to a finishing welt with a grained bead surface and a method of making such a welt and, more particularly, to such a welt wherein it is made with an uninterrupted grained bead surface.

Finishing welts are used extensively in upholstery. While the welts of the present invention are applicable to all types of upholstery where such welts are used they are particularly useful in finishing the interiors of automobiles. Such welts may be used along the edges of two adjoining panels to fasten the panels together or to join a panel to the automobile body. The welts are provided with a bead portion which gives a decorative appearance at the line of the juncture.

It has been common practice for some time to make finishing welts of plastic material. It has been thought desirable from a decorative standpoint to emboss the bead portion so as to achieve the grainy appearance of some leathers.

Two techniques have been tried. One of them involves passing the bead portion between two graining rollers, one on each side of the bead. While this method grains the major part of the bead surface, it leaves a relatively straight line at the point where the rollers meet. This line mars the appearance of the bead.

The other method comprises passing the bead beneath one graining roller. The bead is flattened and a grain is impressed over approximately one half of the surface. This method is objectionable because it leaves part of the surface ungrained.

By the present invention the entire area of the bead surface is provided with an uninterrupted grain.

Therefore, it is a principal object of the present invention to provide a finishing welt with an uninterrupted grain covering the outer surface.

It is a further object of the present invention to provide a method for manufacturing such a welt which is economical and compatible with standard production machinery.

Other objects of this invention will appear in the following description and appended claims, reference being had to the accompanying drawings forming a part of this specification wherein like reference characters designate corresponding parts in the several views.

In the drawings:

Fig. 1 is a top plan view showing the fusing step and associated rollers of the Fig. 2 embodiment.

Fig. 2 is a side elevational view showing the steps involved in making a finishing welt according to one embodiment of the present invention.

Fig. 3 is a sectional view of the finishing welt taken along the line 3—3 of Fig. 2.

Fig. 4 is a sectional view of the finishing welt taken along the line 4—4 of Fig. 2.

Fig. 5 is a view in perspective of a finishing welt made according to the method shown in Fig. 1.

Fig. 6 is a side elevational view of a second embodiment of the present invention illustrating the steps of feeding filler material into the bead portion of the finishing welt.

Fig. 7 is a top plan view of the Fig. 6 embodiment.

Fig. 8 is a view in perpective of a finishing welt made according to the Fig. 6 embodiment.

Before explaining the present invention in detail, it is to be understood that the invention is not limited in its application to the details of construction and arrangements of parts illustrated in the accompanying drawings, since the invention is capable of other embodiments and of being practiced or carried out in various ways. Also, it is to be understood that the phraseology or terminology employed herein is for the purpose of description and not of limitation.

The welt is initially formed of a plastic material by means of heat and pressure in an extrusion die. The welt leaves the die as a continuous strip and may be cut to any desirable length.

The shape of the welt as it leaves the die, shown diagrammatically at 60, is illustrated in Fig. 4. An arcuate bead portion 10 is formed having flanges 12, 14 of reduced thickness extending outwardly and downwardly from the ends 16, 18 resulting in a V-shaped cross-section.

The welt while still hot is directed between two rollers 20, 22 in pressure contact therewith. Either the upper 22 or lower roller 20 may be driven. Preferably, the lower roller 20 is driven. This may be accomplished by any suitable variable speed drive. The roller 20 is preferably covered with a material having a high coefficient of friction, such as rubber, so as to prevent slippage of the welt.

The upper roller 22 has a roughened circumferential surface. It is universally adjustable under tension. As the welt passes between the rollers 20, 22, it is flattened as shown in Fig. 3. As may be noted in Fig. 3, due to the reduced cross-section of the flanges 12, 14, relative to the thickness of the arcuate portion 10, the outer or convex surface 24 of the portion 10 is offset from the flanges 12, 14. This results in the entire outer surface 24 of the arcuate portion 10, but not the flanges 12, 14, being embossed by the action of the roller 22 as the welt passes thereunder. Thus an uninterrupted grain is impressed upon the entire outer surface 24 of the arcuate portion 10. Grain fade-out may be prevented by cooling the welt at this point. This may be accomplished by lowering the temperature of the rollers 20, 22 by running one of them in a water bath.

The welt is then directed over two rollers 26, 28 which contact the inner or concave surface 30 of the arcuate portion 10. The periphery of these rollers 26, 28 conforms substantially to the shape and size of the concave surface 30 in its original extruded form. The purpose of these rollers 26, 28 is to reform and support the welt. This process is aided by the "memory" characteristic of the plastic material. That is, the welt tends to resume its original shape without the application of any external forces. The rollers 26, 28 are idler rollers and do not have a positive axial drive.

The welt is then directed beneath a form roller 32 which is also an idler roller. A groove 34 extends axially inwardly from the periphery of the roller 32. This groove is the same shape and size as the concave surface 24 of the welt in its original extruded form. At this point the welt resumes substantially its original extruded shape.

The flanges 12, 14 of the welt are then directed between two pinch rollers 36, 38. These rollers 36, 38 are each axially driven. The drive is a variable speed drive. The pinch rollers are also universally adjustable under tension. Pressure is exerted against the flanges 12, 14. The plastic material at this point still retains some of the heat imparted to it in the extrusion step. As a result of this heat and pressure, the flanges 12, 14 fuse together to form a unitary web portion 40 which extends at substantially right angles from the hollow circular bead portion 42.

A guide finger 44 is provided immediately adjacent the pinch rollers 36, 38. The finger 44 extends between the flanges 12, 14 and into the bead portion 10. It acts to support the welt, separate the flanges 12, 14 and guide them between the pinch rollers 36, 38.

The finished size of the welt is kept within desirable tolerances by variation in speed between the pinch rollers 36, 38 and the rollers 20, 22. The tension on the welt may be increased or decreased by this means, resulting in a stretching or contracting of the welt.

During the entire process no heat is added other than that imparted in the extrusion step. It has been found that it is not necessary to add more heat to maintain the desired pliability of the plastic material.

It is sometimes desirable to provide a filler within the hollow bead portion of a finishing welt. For instance, in interior finishes of automobiles, a windlace is provided adjacent the inner edges of the doors. A windlace is a finishing welt wherein the hollow bead portion contains a resilient material. The filler provides a resilient support for the bead portion.

The larger size of the bead portion of such welts and the stresses to which they are subjected necessitate greater support for the bead portion than can be supplied by the structural material alone.

The process for making such a welt is illustrated in Figs. 6 and 7. The method is the same as previously described up to the point of and including the form roller 32.

The guide finger 44 is substituted by a hollow tube 46. The tube 46 performs the same function as the guide finger 44 in supporting, directing and separating the flanges 12, 14. In addition, it feeds a tubular strip 56 of resilient material, such as sponge rubber, into the hollow bead portion 10.

The tube 46 is positioned vertically, having the distal portion 48 curved toward the pinch rollers 36, 38 so as to be in substantial alignment with the welt as it enters the pinch rollers.

The upper end 50 of the tube 46 is immediately adjacent to the pinch rollers and located at their convergence. This position is made possible by cutouts 52, 54 which conform to the curve of the rollers 36, 38. Consequently, the flanges 12, 14 are fused together immediately after the strip 56 has been inserted into the bead portion 10. This prevents the resilient material 56 from falling away from the welt.

The strip 56 is forced through the tube by means of pressure exerted at a point distant from the welt. By pushing the resilient material into the welt instead of pulling it in by means of frictional contact with the welt, the strip 56 is inserted in a substantially undeformed state. This condition obviates a contraction when the "pulling" stress is removed which would result in the bead portion being incompletely filled.

The finished welt with a filler material is shown in Fig. 8. This welt is substantially the same as the welt of Fig. 5 except for the filler material.

Having thus described our invention, we claim:

1. The process of making a finishing welt of a synthetic plastic material comprising the steps of first forming the welt by means of heat and pressure in an extrusion die in the shape of an arcuate bead portion having a flange extending from each end thereof; said flanges having a thinner cross-section than the bead portion; then passing said welt between a plurality of rollers, one of which is provided with a roughened surface, whereby said welt is flattened and a grain is impressed upon the convex surface of said arcuate portion, then applying pressure to the flanges while the plastic material still retains sufficient of the heat imparted to it in the extrusion step to cause said flanges to fuse together, thereby forming a welt comprising a curved hollow bead portion having an uninterrupted grain on the entire outer surface and being provided with a web portion extending therefrom.

2. In a process of making a finished welt of synthetic plastic material, the steps of initially extruding the welt as a central arcuate bead portion having marginal flanges to either side thereof of lesser thickness, pressing a surface grain into the bead portion and incident thereto flattening the convex surface of the bead portion, reforming the welt under pressure to its original configuration, deforming the welt flanges into contact with one another, and finally fusing the flanges to one another by pressure alone and utilizing residual heat from the extrusion step.

3. The process of making a finishing welt of a synthetic plastic material comprising the steps of first forming the welt by means of heat and pressure in an extrusion die in the shape of an arcuate bead portion having a flange of thinner cross-section than the bead portion extending from each end thereof, then subjecting said welt to pressure contact with a plurality of rollers having flat faces, one of which is provided with a roughened surface, whereby a grain is impressed upon the flattened convex surface of said arcuate portion, then passing said welt over a plurality of rollers in contact with the concave surface of said arcuate portion, and then under a roller in facial contact with the convex surface of said arcuate portion, the periphery of said rollers conforming to the shape and size of said arcuate portion in its original extruded form, whereby said welt resumes substantially its original extruded form, then passing said welt over a guide finger whereby said flanges are separated and directed between a plurality of pinch rollers in pressure contact therewith to apply pressure to the flanges while the plastic material still retains sufficient of the heat imparted to it in the extrusion step to cause said flanges to fuse together, thereby forming a welt comprising a curved hollow bead portion having an uninterrupted grain on the entire outer surface and being provided with a web portion extending therefrom.

4. The process of making a finishing welt of a synthetic plastic material comprising the steps of first forming an arcuate bead portion having a flange of thinner cross-section than the bead portion extending from each end thereof, then subjecting said arcuate portion to pressure contact with a plurality of rollers having flat faces, one of said rollers being provided with a roughened surface, whereby a grain is impressed upon the flattened convex surface of said arcuate portion, then passing said arcuate portion over a hollow tube with said hollow tube extending between and separating said flanges, a resilient material being fed through said hollow tube and into the cavity formed by the concave surface of said arcuate portion, then subjecting said flanges to pressure contact with each other while the plastic material still retains sufficient of the heat imparted to it in the extrusion step to cause said flanges to fuse together, said pressure contact being applied by means of a plurality of pinch rollers, thereby forming a finishing welt comprising a hollow bead portion filled with a resilient material and having an uninterrupted grain on the entire outer surface and being provided with a web portion extending therefrom.

5. The process of making a finishing welt of a synthetic plastic material comprising the steps of first forming an arcuate bead portion having a flange of thinner cross-section than the bead portion extending from each end thereof, then subjecting said arcuate portion to pressure contact with a plurality of rollers having flat faces, one of said rollers being provided with a roughened surface, whereby a grain is impressed upon the convex surface of said arcuate portion, then passing the flattened concave surface of said arcuate portion over a plurality of rollers in facial contact therewith and then under a roller in facial contact with the convex surface of said arcuate portion, the periphery of said rollers conforming to the shape and size of said arcuate portion in its original extruded form, whereby said arcuate portion and flanges resume substantially their original extruded form, then passing said arcuate portion over a hollow tube with said hollow tube extending between and separating said flanges, a resilient material being fed through said hollow tube and into the cavity formed by the concave surface of said arcuate portion, then applying pressure to the flanges by means of a plurality of pinch rollers while the plastic material still retains sufficient of the heat imparted to it in the extrusion step to cause said flanges to fuse together, thereby forming a finishing welt comprising a hollow curved bead portion filled with a resilient material and having an uninterrupted grain on the entire outer surface and being provided with a web portion extending therefrom.

6. The process of making a finishing welt of a synthetic plastic material comprising the steps of first forming the welt by means of heat and pressure in an extrusion die in the shape of an arcuate bead portion having a flange of thinner cross-section than the bead portion extending outwardly and downwardly from each end thereof, then flattening said arcuate portion and impressing a grain on the outer surface thereof by means of rollers, then reshaping said welt to substantially its original extruded form by means of a plurality of rollers, then applying pressure to the flanges while the plastic material still retains sufficient of the heat imparted in the extrusion step to cause said flanges to fuse together, thereby forming a welt comprising a hollow bead portion having an uninterrupted grain on the entire outer surface and being provided with a web portion extending therefrom.

References Cited in the file of this patent

UNITED STATES PATENTS

| | | |
|---|---|---|
| 1,440,007 | Freeman et al. | Dec. 26, 1922 |
| 1,939,878 | Davidson | Dec. 19, 1933 |
| 1,958,131 | Davidson | May 8, 1934 |
| 2,141,405 | Randall | Dec. 27, 1938 |
| 2,175,099 | Abbott | Oct. 3, 1939 |
| 2,235,688 | Short | Mar. 8, 1941 |
| 2,293,246 | Fay | Aug. 18, 1942 |
| 2,323,862 | Zimmerman et al. | July 6, 1943 |
| 2,555,409 | Hosfield | June 5, 1951 |
| 2,646,378 | Morin | July 21, 1953 |
| 2,671,041 | Dodge | Mar. 2, 1954 |